US009008458B2

(12) United States Patent
Pack

(10) Patent No.: US 9,008,458 B2
(45) Date of Patent: Apr. 14, 2015

(54) LOCAL AREA PROCESSING USING PACKED DISTRIBUTION FUNCTIONS

(71) Applicant: Raytheon Company, Waltham, MA (US)

(72) Inventor: William C. Pack, Torrance, CA (US)

(73) Assignee: Raytheon Company, Waltham, MA (US)

( * ) Notice: Subject to any disclaimer, the term of this patent is extended or adjusted under 35 U.S.C. 154(b) by 162 days.

(21) Appl. No.: 13/761,398

(22) Filed: Feb. 7, 2013

(65) Prior Publication Data

US 2014/0233862 A1    Aug. 21, 2014

(51) Int. Cl.
*G06K 9/00* (2006.01)
*G06K 9/40* (2006.01)
*G06T 5/00* (2006.01)
*G06T 5/40* (2006.01)

(52) U.S. Cl.
CPC .............. *G06T 5/007* (2013.01); *G06T 5/009* (2013.01); *G06T 5/40* (2013.01); *G06T 2207/20004* (2013.01)

(58) Field of Classification Search
None
See application file for complete search history.

(56) References Cited

U.S. PATENT DOCUMENTS

| | | | |
|---|---|---|---|
| 4,231,065 A | 10/1980 | Fitch et al. | |
| 5,210,610 A | 5/1993 | Kanashiki et al. | |
| 5,883,984 A | 3/1999 | Huang et al. | |
| 5,930,402 A | 7/1999 | Kim | |
| 6,272,245 B1 * | 8/2001 | Lin | 382/195 |
| 6,826,310 B2 | 11/2004 | Trifonov et al. | |
| 7,042,522 B2 | 5/2006 | Kim | |
| 7,102,697 B2 | 9/2006 | Lei et al. | |
| 7,362,915 B2 | 4/2008 | Vuylsteke | |
| 7,602,447 B2 | 10/2009 | Arici et al. | |
| 7,760,961 B2 | 7/2010 | Moldvai | |
| 8,000,551 B2 | 8/2011 | Arici et al. | |
| 8,103,120 B2 | 1/2012 | Choi et al. | |
| 8,547,444 B2 * | 10/2013 | Kinrot et al. | 348/222.1 |
| 8,824,795 B2 * | 9/2014 | Lesellier | 382/169 |
| 2007/0009167 A1 | 1/2007 | Dance et al. | |
| 2007/0041657 A1 * | 2/2007 | Rychagov et al. | 382/274 |
| 2008/0037868 A1 * | 2/2008 | Han et al. | 382/169 |
| 2009/0087092 A1 * | 4/2009 | Min et al. | 382/169 |
| 2010/0283874 A1 * | 11/2010 | Kinrot | 348/242 |
| 2012/0082397 A1 | 4/2012 | Zhai et al. | |
| 2012/0148155 A1 * | 6/2012 | Lesellier | 382/169 |

OTHER PUBLICATIONS

Cvetkovic, S.D.; Klijn, P.H.N., "Adaptive Tone-Mapping Transfer Functions for High Dynamic Range Video Cameras," Consumer Electronics, 2008. ICCE 2008. Digest of Technical Papers. International Conference on, vol., no., pp. 1,2, Jan. 9-13, 2008.*

(Continued)

*Primary Examiner* — Andrae S Allison
(74) *Attorney, Agent, or Firm* — Burns & Levinson LLP; Joseph M. Maraia

(57) ABSTRACT

Described herein are devices and techniques for providing adaptable Local Area Processing (LAP) contrast enhancement of imagery by redistributing pixel intensity values in a dynamic range of an imaging device according to a packed statistical distribution function, wherein the redistribution is achieved according to a recursive packing factor.

13 Claims, 8 Drawing Sheets

(56) References Cited

OTHER PUBLICATIONS

Bai et al.; "On a Self-Adaptive Enhancement Algorithm of Color Image"; 2010 Symposium on Photonics and Optoelectronic—IEEE; Chengdu, China; Jun. 19-21, 2010; [ISBN: 978-1-4244-4964-4] [INSPEC Accession No. 11413390] 4 pages.

Chatterji et al.; "Adaptive Contrast Enhancement for Color Images"; International Conference on Information, Communications and Signal Processing—ICICS '97—IEEE; Singapore; Sep. 9-12, 1997; [ISBN: 0-7803-3676-3/97] [INSPEC Accession No. 5978922] vol. 3, pp. 1537-1541.

Choudhury et al.; "Perceptually Motivated Automatic Color Contrast Enhancement Based on Color Constancy Estimation"; EURASIP Journal on Image and Video Processing; [Hindawi Publishing Corporation (Publisher)] [Z. Wang (Ed.)]; [Retrieved online] [Downloaded from: http://jivp.eurasipjournals.com/content/2010/11837237]; vol. 2010, Article ID: 837237, 22 pages (Oct. 11, 2010).

Chung et al.; "Efficient Edge-Preserving Algorithm for Color Contrast Enhancement with Application to Color Image Segmentation"; J. Vis. Commun. Image R.; [Elsevier (Publisher)]; 19(5):299-310 (Jul. 2008).

Corchs et al.; "Adaptive Contrast Enhancement for Underexposed Images"; Digital Photography VII—SPIE & IS&T Electronic Imaging Conference; San Francisco, CA, U.S.A.; Jan. 23, 2011; [Imai et al. (Eds.)]; [Retrieved online] [Downloaded from: http://spiedigitallibrary.org/]; vol. 7876, pp. 78760X-1-78760X-9.

Dileep et al.; "A Comparison Between Different Colour Image Contrast Enhancement Algorithms"; 2011 International Conference on Emerging Trends in Electrical and Computer Technology—IEEE; Tamil, Nadu; Mar. 23-24, 2011; [ISBN: 978-1-4244-7926-9/11] [INSPEC Accession No. 11973794] pp. 708-712.

Han et al.; "Illumination Estimation Based Color Contrast Enhancement"; 2012 Eighth International Conference on Intelligent Information Hiding and Multimedia Signal Processing—IEEE Computer Society; Piraeus, Greece; Jul. 18-20, 2012; [ISBN: 978-0-7695-4712-1] [INSPEC Accession No. 12949095] pp. 522-525.

Kim et al.; "Contrast Enhancement Using Histogram Equalization Based on Logarithmic Mapping"; Optical Engineering—SPIE; [Retrieved online] [Downloaded from: http://spiedigitallibrary.org/]; [ISBN: 0091-3286/2012] vol. 51, No. 6, pp. 067002-1-067002-10 (Jun. 1, 2012).

Kim et al.; "Novel Contrast Enhancement Scheme for Infrared Image Using Detail-Preserving Stretching"; Optical Engineering—SPIE; [Retrieved online] [Downloaded from: http://spiedigitallibrary.org/]; vol. 50, No. 7, pp. 077002-1-077002-10 (Jul. 6, 2011).

Kwok et al.; "Color Image Contrast Enhancement Using a Local Equalization and Weighted Sum Approach"; 6th Annual IEEE Conference on Automation Science and Engineering—IEEE; Marriott Eaton Centre Hotel; Toronto, Ontario, Canada; Aug. 21-24, 2010; [ISBN: 978-1-4244-5449-5/10] [INSPEC Accession No. 11555734] pp. 568-573.

Li et al.; "A Novel Contrast Enhancement Algorithm for Infrared Laser Images"; 2009 International Conference on Information Engineering and Computer Science—IEEE; Wuhan, China; Dec. 19-20, 2009; [ISBN: 978-1-4244-4994-1/09] [INSPEC Accession No. 11032828] 4 pages.

Lu; "Brightness-Preserving Weighted Subimages for Contrast Enhancement of Gray-Level Images"; Journal of Electronic Imaging—SPIE & IS&T; [ISBN: 0091-3286/2012] vol. 21, No. 3, pp. 033001-1-033001-11 (Jul. 9, 2012).

Lu et al.; "Comparative Study of Histogram Equalization Algorithms for Image Enhancement"; 2010 Mobile Multimedia/Image Processing, Security, and Applications—Proc. of SPIE 7708; Apr. 5, 2010; [S. Agaian et al. (Eds.)]; [Retrieved online] [Downloaded from: http://spiedigitallibrary.org/]; vol. 7708, pp. 770811-1-770811-11.

Narendra et al.; "Real-Time Adaptive Contrast Enhancement"; IEEE Transactions on Pattern Analysis and Machine Intelligence—IEEE Computer Society; Nov. 1981; [ISSN: 0162-8828] vol. PAMI-3, No. 6, pp. 655-661.

Panetta et al.; "Color Image Enhancement Based on the Discrete Cosine Transform Coefficient Histogram"; Journal of Electronic Imaging—SPIE& IS&T; [Retrieved online] [Downloaded from: http://spiedigitallibrary.org/]; [ISBN: 0091-3286/2012] vol. 21, No. 2, pp. 021117-1-021117-10 (Apr. 1, 2012).

Peli et al.; "Adaptive Filtering for Image Enhancement"; International Conference on Acoustics, Speech, and Signal Processing, ICASSP '81—IEEE; Apr. 1981; vol. 6, pp. 1117-1120 (Jan. 29, 2003).

Schettini et al.; "Contrast Image Correction Method"; Journal of Electronic Imaging—SPIE & IS&T; [Retrieved online] [Downloaded from: http://spiedigitallibrary.org/]; vol. 19, No. 2, pp. 023005 (1-11) (Apr. 15, 2010).

Shen et al.; "Image Enhancement Using Piecewise Transfer Functions with Segmentations"; 2008 IEEE International Symposium on Consumer Electronics; Vilamoura, Algarve, Portugal; Apr. 14-16, 2008; [ISBN: 978-1-4244-2422-1] [INSPEC Accession No. 10132782] 4 pages.

Subr et al.; "Greedy Algorithm for Local Contrast Enhancement of Images"; Image Analysis and Processing—ICIAP 2005—13th International Conference [LNCS 3617]; Cagliari, Italy; Sep. 2005; [Springer-Verlag, Berlin, Heidelberg (Publisher)] [Roli and Vitulano (Eds.)]; vol. 3617, 8 pages.

Tsai et al. "Contrast Enhancement by Automatic and Parameter-Free Piecewise Linear Transformation for Color Images"; IEEE Transactions on Consumer Electronics; May 2008; [ISBN: 0098-3063108] [INSPEC Accession No. 10090587] vol. 54, No. 2, pp. 213-219.

Wang et al.; "Adaptive Color Contrast Enhancement for Digital Images"; Optical Engineering—SPIE; [Retrieved online] [Downloaded from: http://spiedigitallibrary.org/]; [ISBN: 0091-3286/2011] vol. 50, No. 11, pp. 117006-1-117006-16 (Nov. 8, 2011).

Xiao et al.; "Contrast Enhancement of Color Images Based on Wavelet Transform and Human Visual System"; Graphics and Visualization in Engineering - Proceedings of the IASTED International Conference; Clearwater, Florida, U.S.A.; Jan. 3-5, 2007; [ISBN: 978-0-88986-625-6] pp. 58-63.

Zhang et al.; "An Efficient Non-Linear Algorithm for Contrast Enhancement of Infrared Image"; Proceedings of the Fourth International Conference on Machine Learning and Cybernetics—IEEE; Guangzhou, China; Aug. 18-21, 2005; [ISBN: 0-7803-9091-1/05] [INSPEC Accession No. 8705064] vol. 8, pp. 4946-4951.

Zhao et al.; "Automatic Digital Image Enhancement for Dark Pictures"; 2006 International Conference on Acoustics, Speech and Signal Processing—IEEE; Toulouse, France; May 14-19, 2006; [ISBN: 1-4244-0469-X/06] [INSPEC Accession No. 9142735] vol. 2, pp. II-953-II-956.

International Search Report and Written Opinion of the International Searching Authority, date of mailing, Jun. 17, 2014, from Parent PCT/US2013/071860 filed Nov. 26, 2013.

Cvetkovi, S D et al., "Adaptive Tone-Mapping Transfer Functions for High Dynamic Range Video Cameras," Consumer Electronics, 2008. Digest of Technical Papers. International Conference on IEEE, Piscataway, NJ, USA, Jan. 9, 2008, pp. 1-2.

Arici, T., et al., "A Histogram Modification Framework and Its Application for Image Contrast Enhancement", IEEE Transactions on Image Processing, IEEE Service Center, Piscataway, NJ, USA, vol. 18, No. 9, Sep. 1, 2009, pp. 1921-1935.

Sakaue S., et al. "Adaptive Gamma Processing of the Video Cameras for the Expansion of the Dynamic Range," IEEE Service Center, New York, NY, USA, vol. 41, No. 3, Aug. 1, 1995, pp. 555-561.

* cited by examiner

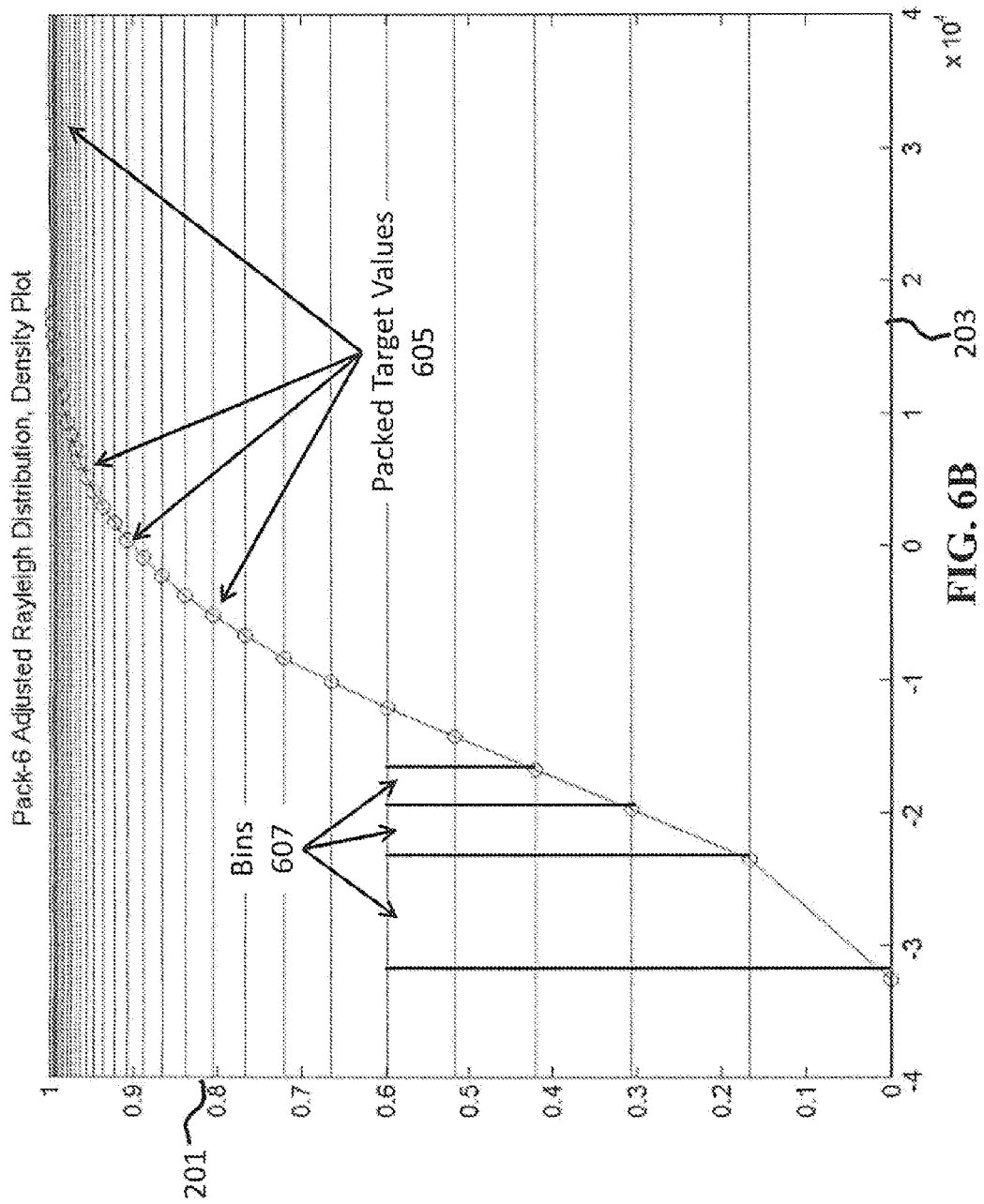

LOCAL AREA PROCESSING USING PACKED DISTRIBUTION FUNCTIONS

GOVERNMENT SUPPORT

This disclosure was supported, in whole or in part, by Government Contract No: H94003-04-D-0006-0214 awarded by the Department of Defense. The Government may have certain rights in the disclosure

TECHNICAL FIELD

The present disclosure relates generally to the field of local area processing of images. More particularly, this application relates to the technology of automated contrast enhancement of imagery using packed distribution functions.

BACKGROUND

Many of today's image capture devices are digital (digital photo cameras, digital video cameras, digital infrared cameras, digital x-ray machines, digital MRI devices, etc.). Such devices are useful for various purposes including, for example, surveillance, television, movies, photography, weapons targeting, and/or threat detection. Digital image capture devices capture image data (e.g., color, intensity, and/or luminance) at a plurality of pixel locations. However, various conditions such as, for example, lighting conditions, color uniformity, excessive distance, and/or lens limitations can affect the quality of such raw image data. Accordingly, raw imagery can often be blurry, washed out, and/or generally lack clarity.

SUMMARY

A need therefore exists for methods and systems that enhance raw image data to produce enhanced imagery. It would be desirable to provide such methods and techniques having the capability to produce high quality, contrast-enhanced imagery. It would also be desirable that such methods and techniques be able to rapidly adapt to changing image content and variant display devices. In doing so, it would also be desirable to minimize consumption of processing resources.

Pixel intensity data from an image capture device is typically captured as a value for each pixel falling within a dynamic range of an image capture device (e.g., 8-bit, 16-bit, 32-bit, and/or 64-bit). For example, the dynamic range may be $[-2^{15}, 2^{15}-1]$, or any other range of values.

Local Area Processing (LAP) techniques may be used to process raw pixel intensity data to provide enhanced contrast between background elements of an image and features of potential interest. This may be achieved via background intensity equalization, where pixel intensity values are mapped to a number of target intensity values.

During LAP contrast enhancement, pixel intensity values may be classified into smaller value ranges (bins) within the overall dynamic range and each pixel is assigned to a particular bin according to the captured intensity value. Each bin is assigned a target value and, in the contrast-enhanced image, each pixel from that bin will be displayed with an intensity matching the target value. Therefore, the quality of the contrast-enhanced image is largely dependent on the shape and distribution of the chosen target values. Additionally, the most effective values for successful contrast enhancement vary according to image content and dynamic range of a display device used to display the contrast-enhanced image.

An example of the impact that shape and distribution have on LAP-enhanced imagery is provided by mapping pixel intensity data to a uniform linear target distribution. Such a distribution undesirably causes very bright and very dark portions of an image to be equally represented, producing an "enhanced" image that appears over-contrasted and has features that are difficult to distinguish from the background of the image.

Manually redistributing each target value according to prior knowledge of the expected image subject matter may reliably produce a desirable contrast enhancement of image data. However, applying manual redistribution to an image is labor intensive, unable to adapt to varying image content (e.g., lighter or darker backgrounds, terrain changes, changing atmospheric conditions, and/or extremely bright objects), and requires prior knowledge of expected image content. Manual redistribution is also typically fixed to a particular dynamic range and therefore unable to adjust to the variant dynamic ranges of different display devices.

Accordingly, described herein are devices and techniques for providing adaptable Local Area Processing (LAP) contrast enhancement of imagery by redistributing pixel intensity values in a dynamic range of an imaging device according to a packed statistical distribution function. The redistribution is adjusted according to a recursive packing factor. Adaptable redistribution of the target values according to a recursive packing factor requires no prior knowledge of image content, eliminates the need for manual manipulation of distributions, and allows for automated adjustment in response to changing image content.

In one aspect, at least one embodiment described herein provides a method for processing an image. The method includes conforming, using one or more processors, a sampling of a quantity of pixel intensity data of an image to a statistical distribution, wherein the sampling includes n points. The method also includes redistributing the sampling, using the one or more processors, by recursively removing, for each of the n points, 1/m values from a range of distribution values available for point n−1 to generate a packed distribution of the sampling. The method also includes mapping, using the one or more processors, the quantity of pixel intensity data to the packed distribution of the sampling to generate a quantity of contrast-enhanced pixel intensity data. The method also includes conforming, using the one or more processors, an intensity of at least one pixel of the image to the quantity of contrast-enhanced pixel intensity data to produce a contrast-enhanced image.

Any of the aspects and/or embodiments described herein can include one or more of the following embodiments. In some embodiments, the statistical distribution is at least one of a Gaussian distribution, a Rayleigh distribution, a normal distribution, a log-normal distribution, a gamma distribution, a binomial distribution, a Cauchy distribution, or a Weibull distribution. In some embodiments, the statistical distribution is a Rayleigh distribution, and redistributing the sampling is performed according to a sequential relationship $$\{X_n\} = \left\{1 - \left(\frac{m-1}{m}\right)^n\right\},$$

wherein the sequential relationship is defined by $$a = 0, b = 1, X_1 = \frac{b-a}{m},$$

and $$X_i = \frac{b - X_{i-1}}{m} + X_{i-1}$$

for all $$X_1 - X_n.$$

In some embodiments the statistical distribution is a Gaussian cumulative distribution, and redistributing the sampling is performed according to a first sequential relationship $$X_i = X_{i-1} + \left(\frac{b - X_{i-1}}{m}\right)$$

for all $$i \in \left\{\frac{n}{2} + 1, n - 1\right\}$$

and a second sequential relationship $$X_j = X_{j+1} + \left(\frac{a - X_{j+1}}{m}\right)$$

for all $$j \in \left\{2, \frac{n}{2} - 1\right\},$$

wherein each of the first sequential relationship and the second sequential relationship is defined by a=0 and b=1.

In some embodiments, a numerical value of m is greater than 1. In some embodiments the numerical value of m is adjusted, by the one or more processors, in response to an average intensity of the quantity of pixel intensity data, wherein the numerical value of m is increased in response to an increase in the average intensity and the numerical value of m is decreased in response to a decrease in the average intensity.

In another aspect, at least one embodiment described herein provides a non-transitory computer-readable medium having computer-executable instructions for performing a method. The computer-executable instructions include instructions to perform conforming, using one or more processors, a sampling of a quantity of pixel intensity data of an image to a statistical distribution, wherein the sampling includes n points. The computer-executable instructions also include instructions to perform redistributing the sampling, using the one or more processors, by recursively removing, for each of the n points, 1/m values from a range of distribution values available for point n−1 to generate a packed distribution of the sampling. The computer-executable instructions also include instructions to perform mapping the quantity of pixel intensity data to the packed distribution of the sampling to generate a quantity of contrast-enhanced pixel intensity data. The computer-executable instructions also include instructions to perform conforming an intensity of at least one pixel of the image to the quantity of contrast-enhanced pixel intensity data to produce a contrast-enhanced image.

In another aspect, at least one embodiment described herein provides a system for processing an image. The system includes one or more processors. The system also includes an image capture device. The system also includes an image display device. The system also includes computer-executable instructions. The computer-executable instructions include instructions that, when executed, cause the processor to receive, from the image capture device, a quantity of pixel intensity data for an image. The computer-executable instructions also include instructions that, when executed, cause the processor to conform a sampling of the quantity of pixel intensity data to a statistical distribution, wherein the sampling includes n points. The computer-executable instructions also include instructions that, when executed, cause the processor to redistribute the sampling by recursively removing, for each of the n points, 1/m values from a range of distribution values available for point n−1 to generate a packed distribution of the sampling. The computer-executable instructions also include instructions that, when executed, cause the processor to map the quantity of pixel intensity data to the packed distribution of the sampling to generate a quantity of contrast-enhanced pixel intensity data. The computer-executable instructions also include instructions that, when executed, cause the processor to conform, on the image display device, an intensity of at least one pixel of the image to the quantity of contrast-enhanced pixel intensity data to produce a contrast-enhanced image for display on an image display device.

Any of the embodiments described herein can include one or more of the following embodiments. In some embodiments the statistical distribution is at least one of a Gaussian distribution, a Rayleigh distribution, a normal distribution, a log-normal distribution, a gamma distribution, a binomial distribution, a Cauchy distribution, or a Weibull distribution. In some embodiments the system of claim 8, wherein the statistical distribution is a Rayleigh distribution, and the sampling is redistributed according to a sequential relationship $$\{X_n\} = \left\{1 - \left(\frac{m-1}{m}\right)^n\right\},$$

wherein the sequential relationship is defined by $$a = 0, b = 1, X_1 = \frac{b-a}{m}, \text{ and } X_i = \frac{b - X_{i-1}}{m} + X_{i-1}$$

for all $X_1$-$X_n$. In some embodiments the statistical distribution is a Gaussian cumulative distribution, and the sampling is redistributed according to a first sequential relationship $$X_i = X_{i-1} + \left(\frac{b - X_{i-1}}{m}\right) \text{ for all } i \in \left\{\frac{n}{2} + 1, n - 1\right\}$$

and a second sequential relationship $$X_j = X_{j+1} + \left(\frac{a - X_{j+1}}{m}\right) \text{ for all } j \in \left\{2, \frac{n}{2} - 1\right\},$$

wherein each of the first sequential relationship and the second sequential relationship is defined by a=0 and b=1.

In some embodiments the image capture device is at least one of a charge-coupled device, an active-pixel sensor, a CMOS sensor, a cryogenic detector, a photodiode light sensor, or a photoresistor. In some embodiments the image capture device is capable of capturing at least one of a visible light image, an x-ray image, an infrared image, a radar image, a sonar image, or an ultrasound image.

In some embodiments the image display device is at least one of a cathode ray tube (CRT), a liquid crystal display (LCD), an light emitting diode (LED) monitor, or a touch screen monitor.

The LAP methods and systems described herein (hereinafter "technology") can provide one or more of the following advantages. One advantage of the technology is that high-quality contrast-enhancement of imagery can be automated, thereby advantageously increasing system flexibility and eliminating labor-intensive manual contrast-enhancement. The adaptability of the technology advantageously allows for rapid or real-time changes to contrast-enhancement parameters in response to changing image content. The adaptability of the technology further advantageously allows for simultaneous use of or rapid change between image capture and image display devices having variant dynamic ranges.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIGS. 6A-6C are graphical illustrations of target values for packed Rayleigh distributions using packing factors of 3, 6, and 9 respectively in accordance with various embodiments.

DETAILED DESCRIPTION

In the following detailed description of the illustrated embodiments, reference is made to accompanying drawings, which form a part thereof, and within which are shown by way of illustration, specific embodiments, by which the subject matter may be practiced. It is to be understood that other embodiments may be utilized and structural changes may be made without departing from the scope of the disclosure.

The particulars shown herein are by way of example and for purposes of illustrative discussion of the embodiments only and are presented in the case of providing what is believed to be the most useful and readily understood description of the principles and conceptual aspects of the disclosure. In this regard, no attempt is made to show structural details of the subject matter in more detail than is necessary for the fundamental understanding of the disclosure, the description taken with the drawings making apparent to those skilled in that how the several forms of the present disclosure may be embodied in practice. Further, like reference numbers and designations in the various drawings indicate like elements.

Described herein are devices and techniques for providing adaptable Local Area Processing (LAP) contrast enhancement of imagery by redistributing pixel intensity values in a dynamic range of an imaging device according to a packed statistical distribution function, wherein the redistribution is adjusted according to a recursive packing factor.

Various statistical distributions can be used to mitigate the over-contrasting associated with setting target values according to a uniform linear distribution. Examples of statistical distributions that can be used include, but are not limited to, Rayleigh distributions, normal distributions, log-normal distributions, gamma distributions, binomial distributions, Cauchy distributions, and/or Weibull distributions. However, without redistribution of the target values, each such statistical distribution produces contrast-enhanced images that are, to varying degrees, excessively darkened, excessively brightened, over-contrasted, and/or under-contrasted.

Figure 1:
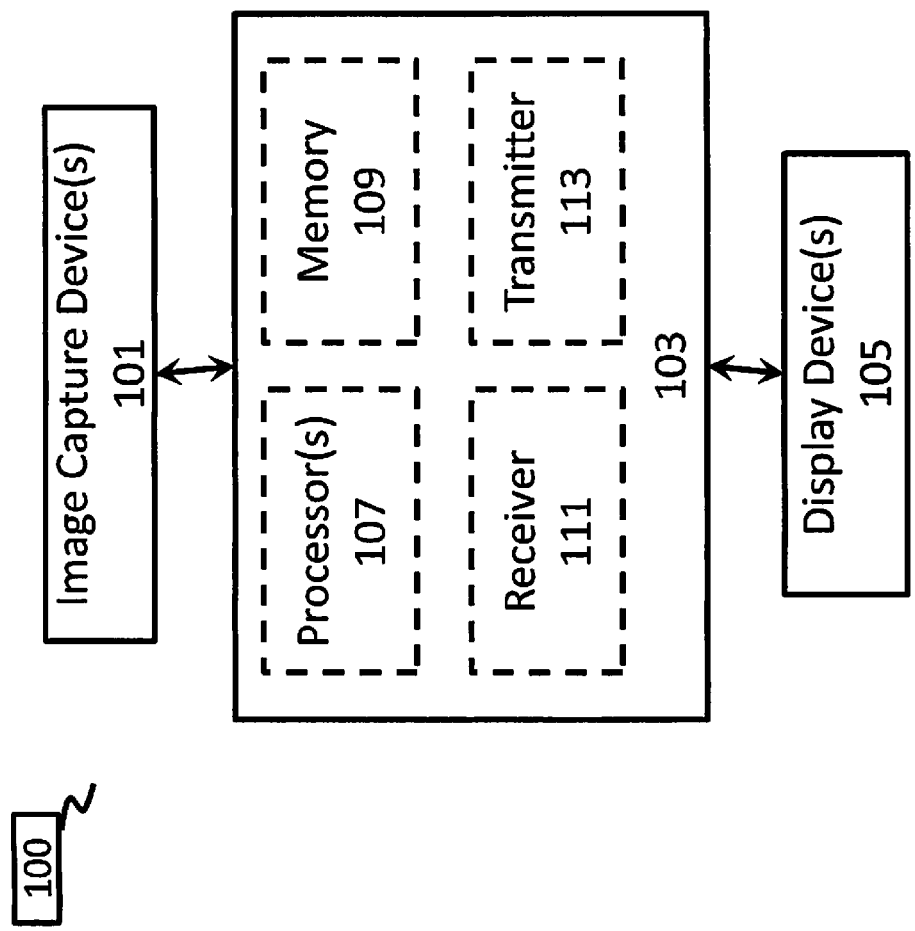
FIG. 1 is a block diagram illustrating an image processing system in accordance with various embodiments.

As illustrated by FIG. 1, an image processing system 100 in accordance with various embodiments may include a LAP module 103. The LAP module 103 receives pixel intensity data from one or more image capture devices 101, applies a packed distribution function to the pixel intensity data, and produces a contrast-enhanced image for display on one or more display devices 105.

Image capture devices 101, in accordance with various embodiments, may include any visible light, x-ray, infrared, ultrasound, and/or any other type of electronic or auditory image capture device. Such image capture devices (e.g., charge-coupled devices (CCD), active-pixel sensors (APS), CMOS sensors, cryogenic detectors, photodiode light sensors, and/or photoresistors) may have any number of pixels (e.g., 256×256, 1 megapixel, 100 megapixels, and/or 1 gigapixel) and may acquire intensity data for each pixel having any dynamic range (e.g., 4-bit, 8-bit, 16-bit, and/or 32-bit). In accordance with various embodiments, one or more image processing systems 100 having one or more image capture devices 101 may be incorporated into any imaging system or systems including, but not limited to, still photo cameras, video cameras, infrared cameras, night vision goggles or cameras, medical imaging devices (e.g., x-ray, MRI, CAT-Scan, ultrasound), radar imaging devices (e.g., Doppler radar), and/or sonar (e.g., side-imaging sonar).

In various embodiments, a LAP module 103 is capable of identifying one or more image capture devices 101 and/or one or more display devices 105 used with an image processing system 100. Such identification may occur via, for example, one or more receivers 111 and/or transmitters 113. Identification of image capture devices 101 and/or display devices 105 provides a way for the LAP module to identify performance parameters and/or operating parameters of the image capture devices 101 and/or display devices 105. Performance parameters and/or operating parameters may include, for example, a dynamic range, a resolution, and/or a focal depth of each such image capture device 101 and/or display device 105.

By way of example, a receiver 111 might be used to receive model identification information from the one or more image capture devices 101 and/or one or more display devices 105. Such model identification information could, in some example embodiments, then be associated with performance and/or operating parameters stored in the memory 109. Such model identification information, in other example embodiments, could also be used by a transmitter 113 to look for performance and/or operating parameters stored on a manufacturer's or other website. In other example embodiments, the receiver 111 may receive performance and/or operating parameters directly from the one or more image capture devices 101 and/or one or more display devices 105.

Pixel intensity values acquired by an image capture device 101 may vary across an entire dynamic range of the image capture device 101 and are largely dependent on image content. For example, an image of the sun would likely produce pixel intensity data concentrated near the top of the dynamic range of an image capture device while an image of the ocean on a moonless night would likely produce pixel intensity data concentrated near the bottom of the dynamic range. More typical image content (e.g., an aerial view of a house) may produce a variety of pixel intensity values.

A LAP module 103, in accordance with various embodiments, may include instructions for enhancement of an image. Such instructions may include, for example, commanding an image processing system 100 to separate the pixel intensity data into a particular number of samples or bins. Such instructions may also include commanding an image processing system 100 how to distribute target intensity values across the dynamic range of an image capture device 101 and/or display device 105. Instructions may also include, for example, commands to assign particular target intensity values to pixels in each sample or bin. Such LAP modules 103 may set target values as a percentage (i.e., target values between 0 and 1) of the dynamic range according to a distribution function. By maintaining target values as a percentage of the dynamic range, the LAP module is compatible with any display device having any dynamic range.

Figure 2:
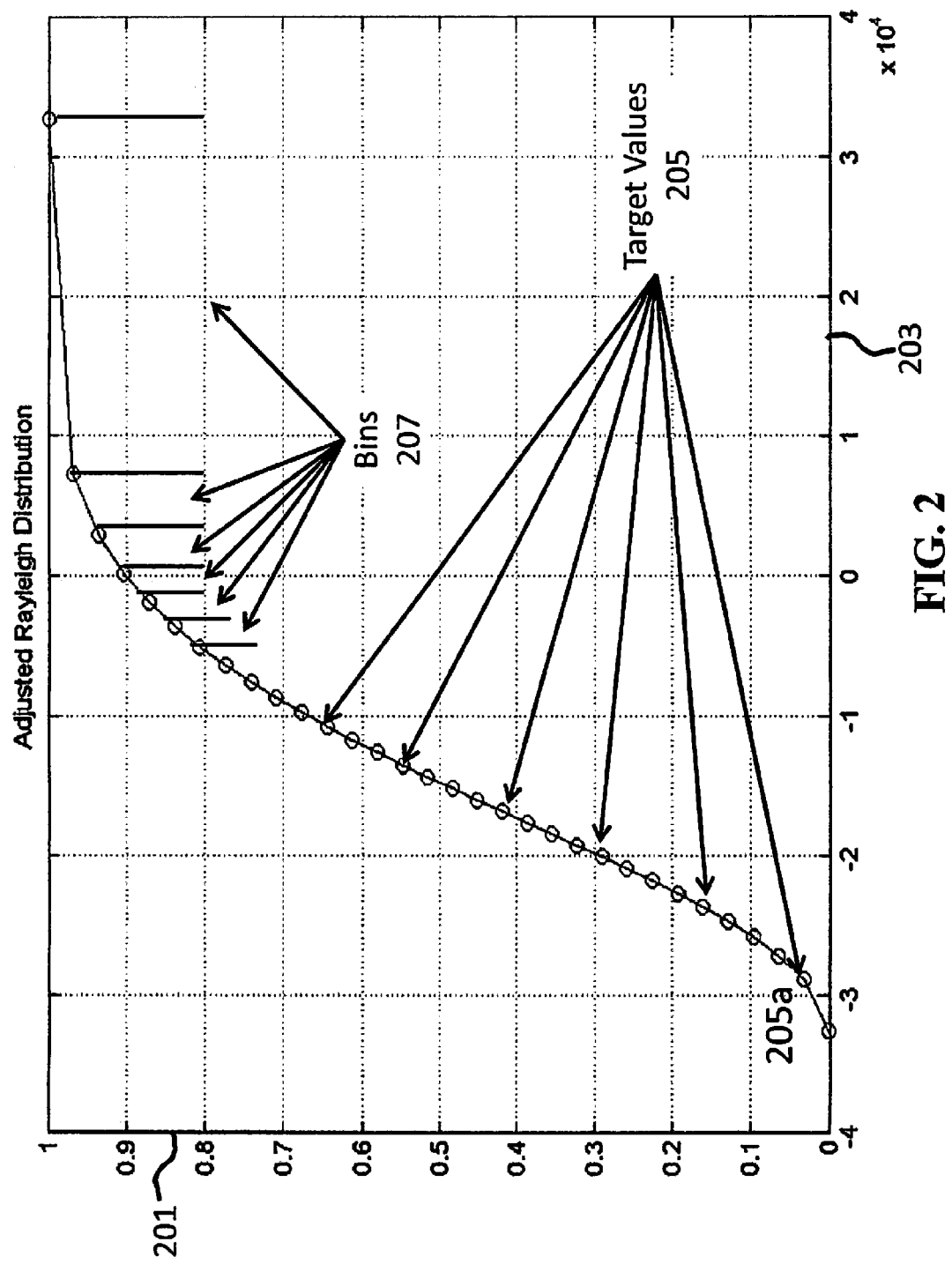
FIG. 2 is a graphical illustration of target values for a uniform Rayleigh distribution in accordance with various embodiments.

By way of example, the LAP module 103 may, for example, provide instructions to the image processing system 100 that 32 samples should be taken along a Rayleigh distribution $R=\sqrt{2\ln[1-U(0,1)]}$, where U(0,1) represents uniformly distributed target values 205 from the interval (0,1) (e.g., 0, 0.03125, 0.06250, ..., 0.96875, 1) along an ordinate axis 201 as shown in FIG. 2. As further shown in FIG. 2, the abscissa 203 represents the dynamic range [$-4\times10^4$, $4\times10^4$] of an image capture device 101. An advantage of setting the target values 205 within a range between 0 and 1 is that the target values 205 are expressed as a percentage of dynamic range and thus can be applied to the dynamic range of any display device 105 by simply multiplying the percentage by the total dynamic range of the particular display device. For example, the second target value 205a shown in FIG. 2 has a target value of 0.03125 or 3.125%. Therefore, if, for example, an 8-bit display device 105 was used to display the enhanced image of FIG. 2, pixels assigned to the second target value 205a would be displayed with an intensity equal to 3.125% of the maximum intensity of an 8-bit dynamic range.

The target values 205 are then mapped to a statistical distribution (e.g., a Rayleigh distribution as shown in FIG. 2) to create bins 207. For clarity, only some of the target values 205 are indicated by an arrow in FIG. 2. However, each of the 32 points depicted along the distribution line in FIG. 2 correlates to a target value 205. Similarly and also for clarity, only some of the bins 207 are depicted by boundary lines in FIG. 2. However, each of the gaps between two target values 205 represents a bin. The intensity value of each pixel data point falls within a bin (i.e., at or between two of the target values 205) and is assigned a value falling within that bin. Such assigned values may be, for example, the higher or lower of the two target values 205 defining the boundaries of that particular bin). As illustrated by FIG. 2, the location of the target values 205 of U(0,1) along the Rayleigh distribution (or other statistical distribution) determines the size of each bin.

Mapping pixel intensity values along a uniform Rayleigh distribution such as the distribution shown in FIG. 2 results in mid-range pixel intensity values being shifted lower in the dynamic range. This is illustrated by comparing the higher concentration of target values 205 located in the lower end of the dynamic range (e.g., less than 0 on the abscissa 203) of FIG. 2 with the relatively low concentration of target values 205 located in the higher end of the dynamic range (e.g., greater than 0 on the abscissa 203) of FIG. 2. Such a shift towards the lower end of the dynamic range gives the output imagery an over-darkened appearance. In order to brighten the image and produce a better contrast-enhanced image, the pixel intensity target values may be shifted (redistributed) higher in the dynamic range.

To achieve a desirable redistribution, LAP modules 103 in accordance with various embodiments may non-uniformly distribute target values according to a packed distribution function. Such packed distribution functions, in many embodiments, identify target values by recursively removing, for each of n samples, 1/m values from a range of distribution values available for sample n−1, thereby generating a packed distribution of the sampling, wherein m is the packing factor.

The packed distribution function may be expressed as a sequential relationship $$\{X_n\} = \left\{1 - \left(\frac{m-1}{m}\right)^n\right\}$$

defined by $$a = 0, b = 1, X_1 = \frac{b-a}{m}, \text{ and } X_i = \frac{b - X_{i-1}}{m} + X_{i-1} \text{ for all } X_1 - X_n.$$

Figure 3:
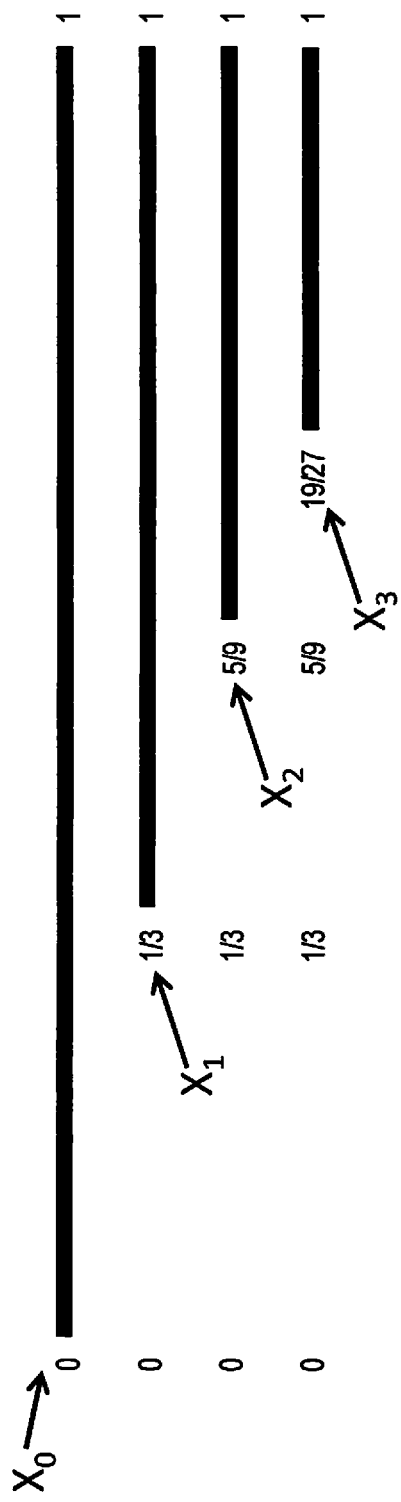
FIG. 3 is a graphical illustration of a recursive packed distribution function in accordance with various embodiments.
Figure 6A:
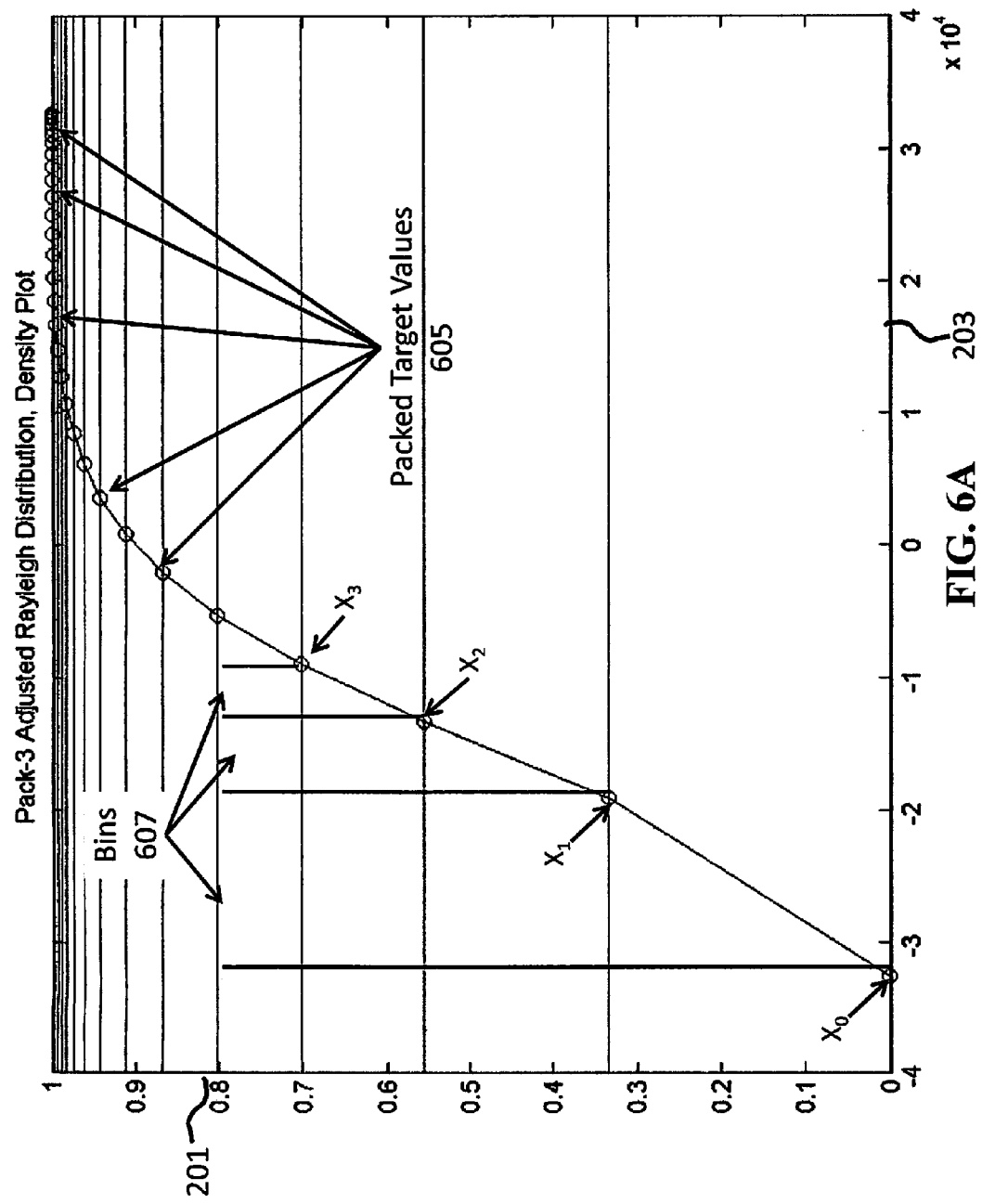

Taken together, FIGS. 3 and 6A illustrate the recursive nature of the packed distribution function as well as the target values assigned to $X_0$, $X_1$, $X_2$, and $X_3$ when a packing factor m=3 is selected (pack-3). The lines on FIG. 3 represent the range of available values (e.g., 0 to 1 as shown for $X_0$). The numbers immediately to the left of each successive line ($X_0$, $X_1$, $X_2$, and $X_3$ as shown) are the iterative outputs of the packed distribution function. FIG. 6A provides a graphical depiction of a packed distribution function having a packing factor of 3. As shown in FIG. 6A, the pack-3 iterative outputs $X_0$, $X_1$, $X_2$, and $X_3$ (also illustrated by FIG. 3) may be used as the target values 605 for a pack-3 LAP contrast enhancement. As further shown in FIG. 6A, the pack-3 Rayleigh redistribution demonstrates low packed target value 605 density below the midpoint of the dynamic range (0 as shown) and demonstrates high packed target value 605 density above the midpoint of the dynamic range. The low packed target value 605 density below the midpoint of the dynamic range results in a high level of brightening of the contrast-enhanced image when compared with a uniform Rayleigh distribution.

Figure 6C:
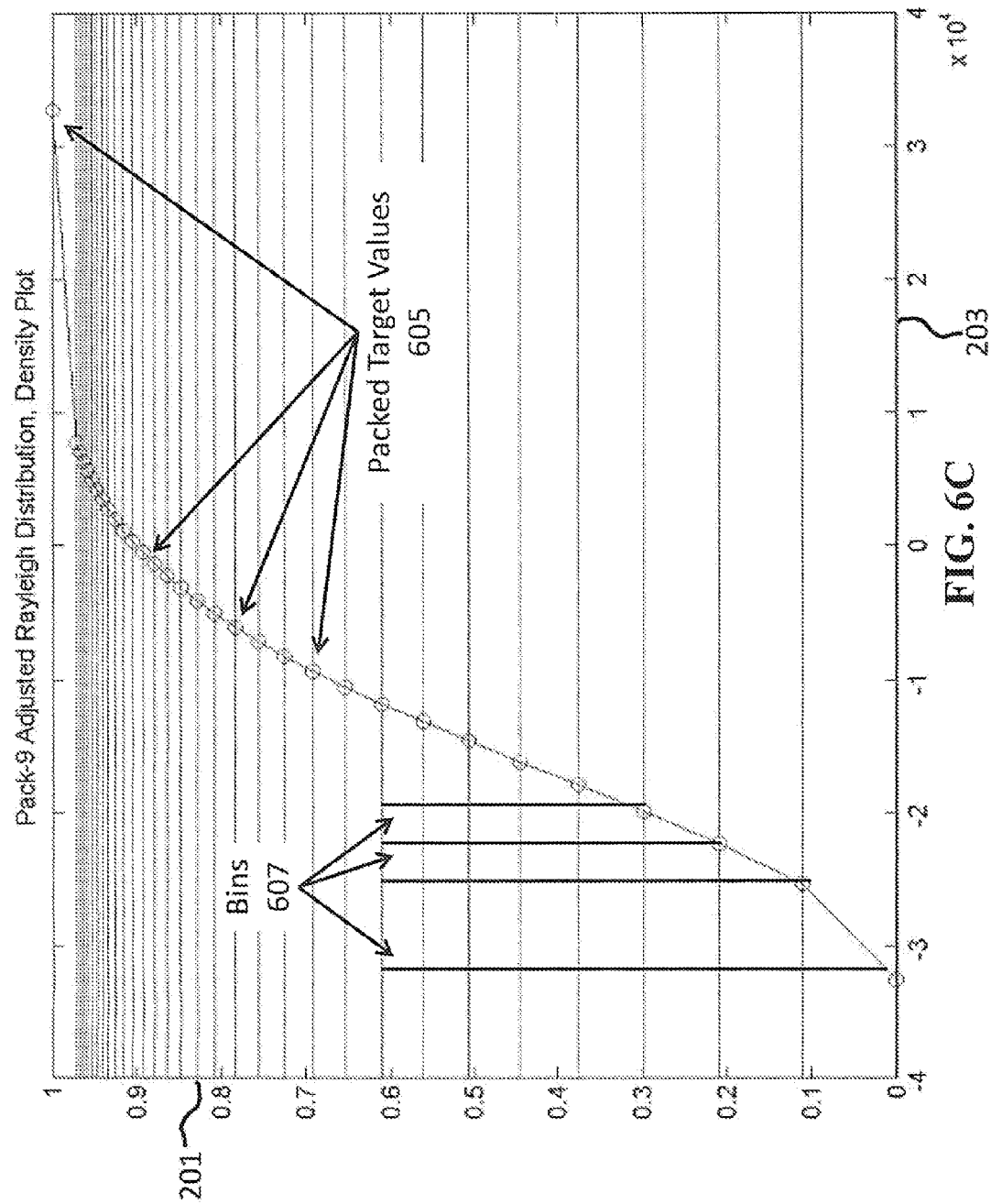

FIGS. 6B and 6C provide graphical depictions of packed distribution functions having packing factors of 6 and 9 respectively. As seen in FIGS. 6A (pack-3), 6B (pack-6), and 6C (pack-9), increasing the packing factor, in various embodiments, shifts the packed target value 605 density progressively lower in the dynamic range. As shown in FIG. 6A, choosing a packing factor of 3 results in the packed target values 605 being densely clustered near the top of the dynamic range. In FIG. 6B, a packing factor of 6 was chosen and the packed target values 605 are densely clustered in the higher region of the dynamic range. However, when compared to FIG. 6A, the packed target values 605 are clustered around a lower average target value and exhibit a more equalized distribution. As shown in FIG. 6C, where a packing factor of 9 was chosen, the packed target values 605 are clustered around a higher average target value when compared with the target values 205 shown in FIG. 2. However, when compared to FIGS. 6A and 6B, the packed target values 605 of FIG. 6C are clustered around a lower average target value and exhibit a more equalized distribution. Accordingly, increasing the packing factor will darken the output imagery and decreasing the packing factor will brighten the output imagery. Therefore, adjusting the packing factor allows for dynamic adjustment according to image content.

In various embodiments, the LAP module 103 may monitor one or more image content factors (e.g., mean pixel intensity, maximum pixel intensity, minimum pixel intensity, difference between maximum and minimum pixel intensity, GPS location, and/or any other suitable data) as part of an automatic adjustment system, thereby providing automated trigger events for changing the packing factor m to a more appropriate value. For example, in various embodiments using mean pixel intensity as an automated trigger event, the LAP module 103 may increase packing factor to darken the output image in response to an increase in mean pixel intensity beyond a threshold level. In further example embodiments, where GPS data is used as an automated trigger event, the packing factor may be adjusted in response to known terrain changes (e.g., decreasing packing factor when GPS location indicates that the background will transition from a relatively bright desert terrain to a relatively dark forest terrain). In yet further embodiments, GPS location may be used in combination with stored astronomical data to adjust packing factor during twilight and/or sunrise, thereby compensating for background intensity changes due to changing environmental light conditions. In such embodiments the LAP module 103 will need no external input to achieve appropriate contrast enhancement.

In various other embodiments, a user-operated controller (not shown) may be provided such that a user may readily adjust the packing factor m as needed. In further embodiments, a user-operated controller may be provided along with an automatic adjustment system as described above to permit correction and/or fine-tuning of the automatic adjustment system.

FIGS. 6A-6C illustrate a LAP system applying a 32-sample Rayleigh distribution to pixel intensity data having a dynamic range of $[-4\times10^4, 4\times10^4]$. However, it will be apparent in view of this disclosure that the devices and techniques described herein may be used with LAP systems having any number of samples, distributed according to any statistical distribution, and applied to pixel intensity data of any dynamic range.

In various embodiments such as, for example, where a Gaussian cumulative distribution function (CDF) is used, one or more packed distribution functions may be applied over multiple, discrete segments of the dynamic range. This is possible because Gaussian CDFs are naturally symmetric about the center of a dynamic range. Accordingly, applying one or more packed distribution functions independently to both the upper and lower ends of the dynamic range allows for greater control over target value distribution at each end of the dynamic range.

Redistribution of pixel intensity target values using a Gaussian CDF may, in various embodiments, be performed by creating a vector, $U(0,1)$, of uniformly distributed values from the interval $(0,1)$. Then, a vector G may be created using the definition of a Gaussian CDF, expressed as $G = \sigma \cdot \sqrt{2} \cdot \text{erf}^{-1}[2U(0,1)-1] + \mu$, where $\mu$ is the image mean and $\sigma$ is the image standard deviation. G is then adjustable to span any given dynamic range.

Using the definition of a Gaussian CDF, an upper portion packed distribution function and a lower portion packed distribution function may be determined and applied to the distribution range. For various embodiments each endpoint (i.e., a=0 and b=1) is fixed and an additional fixed point in the center of the distribution (e.g., n/2 for an n element sampling) may be chosen to be fixed as well. Each packed distribution function may then be expressed as a sequential relationship. The upper portion packed distribution function may be expressed as $$X_i = X_{i-1} + \left(\frac{b - X_{i-1}}{m}\right) \text{ for all } i \in \left\{\frac{n}{2} + 1, n - 1\right\}$$

and the lower portion packed distribution function may be expressed as $$X_j = X_{j+1} + \left(\frac{a - X_{j+1}}{m}\right) \text{ for all } j \in \left\{2, \frac{n}{2} - 1\right\},$$

where each function is defined by a=0 and b=1 and m is the packing factor as described above. When applying the upper portion and lower portion packed distribution functions, independent packing factors may be used in accordance with various embodiments to provide enhanced control the distribution of packed target value 605 density in the upper and lower portions of the dynamic range.

Referring again to FIG. 1, the LAP module 103 may, in various embodiments, apply the packed distribution of the sampling to the pixel intensity data, thereby generating a contrast-enhanced quantity of pixel data. As described above with reference to FIGS. 1 and 2, the target intensity values assigned to the quantity of contrast-enhanced pixel data will be in the form of a percentage of the dynamic range. Accordingly, as described above with reference to FIG. 2, the quantity of contrast-enhanced pixel intensity data will be convertible into any dynamic range, making that data compatible with any display device 105.

As shown in FIG. 1, the LAP module 103 may, in various embodiments, optionally include one or more processors 107 for executing instructions of the LAP module 103 according, for example, to stored packed distribution function(s), pixel intensity data, target values, and/or dynamic ranges. Suitable processors include, by way of example, both general and special purpose microprocessors, field programmable gate arrays (FPGA), application-specific integrated circuits (ASIC), and/or any one or more processors of any kind of digital computer.

The LAP module may also optionally include, for example, one or more memory devices 109 for storing LAP module 101 instructions, a packed distribution function, pixel intensity data, enhanced image data, and/or device identification data. Suitable memory includes, but is not limited to, read-only memory, random access memory, mass storage devices (e.g., magnetic, magneto-optical disks, or optical disks), EPROM, EEPROM, flash memory devices, magnetic disks, internal hard disks, removable disks, CD-ROM, and/or DVD-ROM disks.

The LAP module may, in various embodiments, optionally include one or more receivers 111 and/or transmitters 113 for receiving and/or transmitting data. In some embodiments, the receiver 111 may receive pixel intensity data from one or more image capture devices 101 and the transmitter 113 may transmit a contrast-enhanced image to one or more display devices 105.

As shown in FIG. 1, after applying the packed distribution function to the pixel intensity data, the LAP module 103 may, in various embodiments, display the contrast-enhanced image on one or more display devices 105. Display devices 105 in accordance with various embodiments may, for example, include a cathode ray tube (CRT), liquid crystal display (LCD), LED monitor, and/or touch screen monitor. In various embodiments, the LAP module 103 may apply intensity percentage values generated by the packed distribution function to the dynamic range of a particular display device 105 to generate a displayable image. In other embodiments, the LAP module may provide a display device 105 with instructions such that the display device 105 is able to apply intensity percentage values to its own particular dynamic range to generate such a displayable image.

Figure 4:
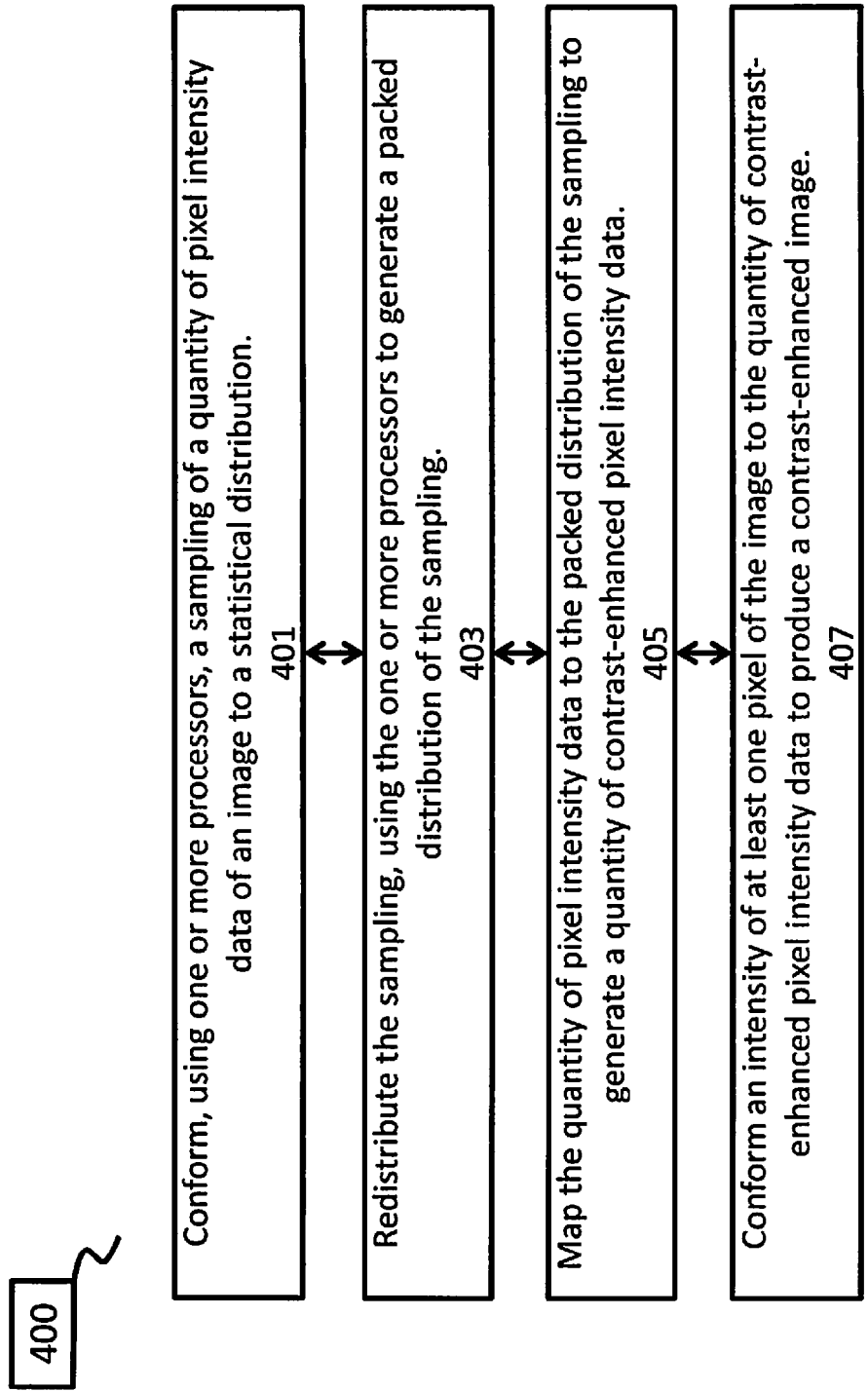
FIG. 4 is flow chart illustrating a method for producing a processed image in accordance with various embodiments.

With reference to FIG. 4, a method 400 for processing an image in accordance with various embodiments may include the steps of conforming a sampling of a quantity of pixel intensity data of an image to a statistical distribution 401, redistributing the sampling to generate a packed distribution of the sampling 403, mapping the quantity of pixel intensity data to the packed distribution of the sampling to generate a quantity of contrast-enhanced pixel intensity data 405, and conforming an intensity of at least one pixel of the image to the quantity of contrast-enhanced pixel intensity data to produce a contrast-enhanced image 407.

Conforming a sampling of a quantity of pixel intensity data of an image to a statistical distribution 401 may include, for example, providing a number n of sample points and distributing them along a statistical distribution (e.g., Rayleigh distribution, normal distribution, log-normal distribution, gamma distribution, binomial distribution, Cauchy distribution, and/or Weibull distribution) relative to a dynamic range of the pixel intensity data. Such techniques include, but are not limited to, the techniques as described hereinabove with reference to FIGS. 1-3.

Redistributing the sampling to generate a packed distribution of the sampling 403 may include, for example, assigning non-uniform target values to the n sample points according to a recursive packed distribution function wherein for each n point, 1/m values from the range of distribution values available for point n−1 are removed. Such techniques include, but are not limited to, the techniques as described hereinabove with reference to FIGS. 1-3.

Mapping the quantity of pixel intensity data to the packed distribution of the sampling to generate a quantity of contrast-enhanced pixel intensity data 405 may include, for example, assigning, according to a packed distribution function, a target value to each data point of the quantity of pixel intensity data to generate a quantity of contrast-enhanced pixel intensity data. Such techniques include, but are not limited to, the techniques as described hereinabove with reference to FIGS. 1-3.

Conforming an intensity of at least one pixel of the image to the quantity of contrast-enhanced pixel intensity data to produce a contrast-enhanced image 407 may include, in various embodiments, producing a contrast-enhanced image by multiplying the target values of each pixel in the quantity of contrast-enhanced pixel intensity data by the dynamic range of at least one display device.

Figure 5:
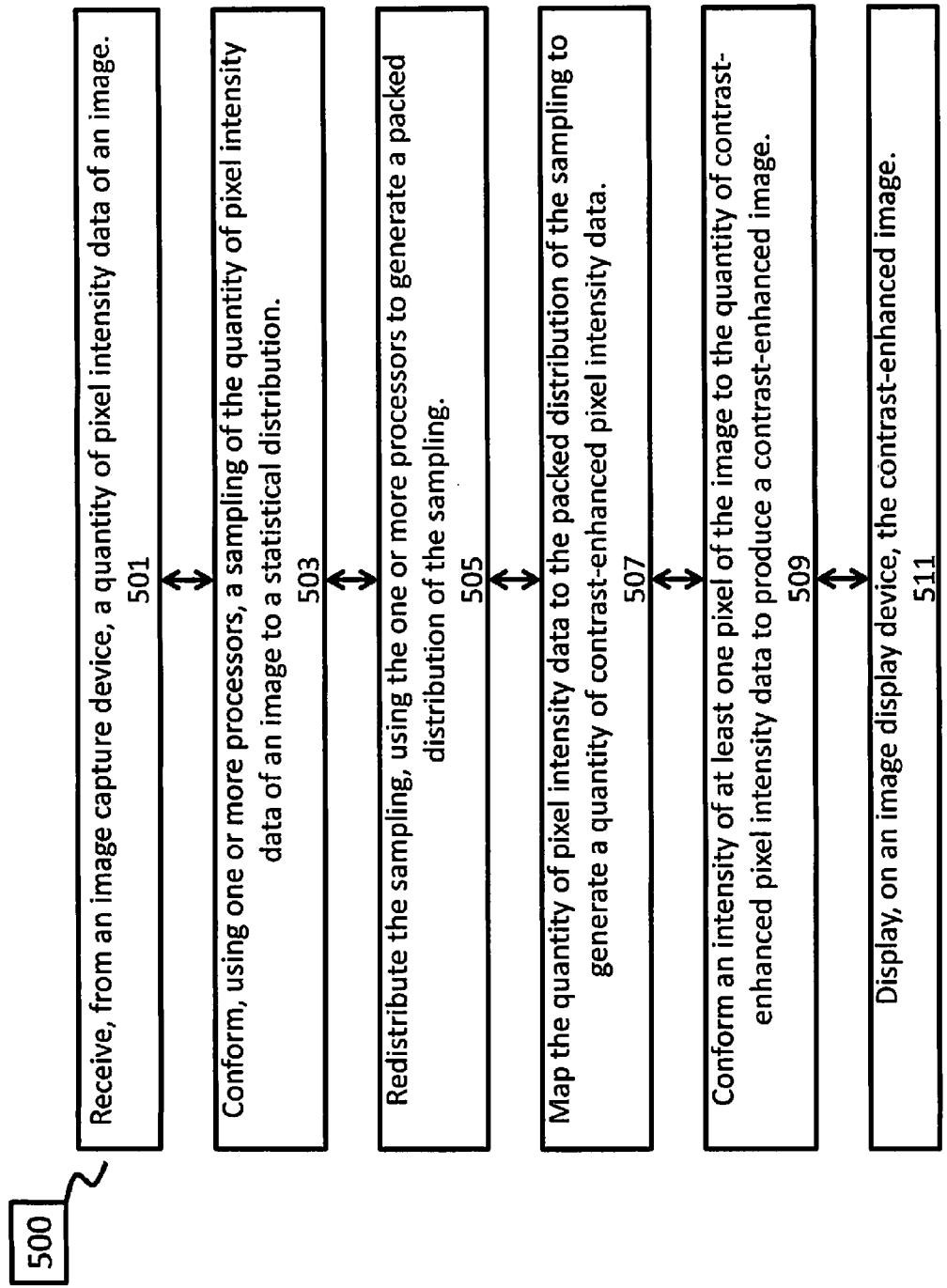
FIG. 5 is a flow chart illustrating a method for displaying a processed image produced in accordance with various embodiments.

With reference to FIG. 5, a method 500 for processing an image in accordance with various embodiments may include the steps of receiving a quantity of pixel intensity data of an image 501, conforming a sampling of the quantity of pixel intensity data of an image to a statistical distribution 503, redistributing the sampling to generate a packed distribution of the sampling 505, mapping the quantity of pixel intensity data to the packed distribution of the sampling to generate a quantity of contrast-enhanced pixel intensity data 507, conforming an intensity of at least one pixel of the image to the quantity of contrast-enhanced pixel intensity data to produce a contrast-enhanced image 509, and displaying the contrast-enhanced image 511.

Receiving a quantity of pixel intensity data of an image 501 may include, in various embodiments, receiving pixel intensity data from one or more image capture devices (e.g., charge-coupled devices (CCD), active-pixel sensors (APS), CMOS sensors, cryogenic detectors, photodiode light sensors, and/or photoresistors) using techniques including, but not limited to, those described above with reference to FIG. 1.

The steps of conforming a sampling of the quantity of pixel intensity data of an image to a statistical distribution 503, redistributing the sampling to generate a packed distribution of the sampling 505, mapping the quantity of pixel intensity data to the packed distribution of the sampling to generate a quantity of contrast-enhanced pixel intensity data 507, and conforming an intensity of at least one pixel of the image to the quantity of contrast-enhanced pixel intensity data to produce a contrast-enhanced image 509 are not limited to but may, in various embodiments, be similar to steps 401, 403, 405, and 407 described above with reference to FIG. 4.

Displaying the contrast-enhanced image 511 may, in various embodiments, include using one or more image display devices (e.g., a cathode ray tube (CRT), liquid crystal display (LCD), LED monitor, and/or touch screen monitor) to display a contrast-enhanced image.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present disclosure has been described with reference to example embodiments, it is understood that the words that have been used herein, are words of description and illustration, rather than words of limitation. Changes may be made, within the purview of the appended claims, as presently stated and as amended, without departing from the scope and spirit of the present disclosure in its aspects.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method for processing an image comprising:
conforming, using one or more processors, a sampling of a quantity of pixel intensity data of an image to a statistical distribution, wherein the sampling comprises n points;
redistributing the sampling, using the one or more processors, by recursively removing, for each of the n points, 1/m values from a range of distribution values available for point n−1 to generate a packed distribution of the sampling, wherein a numerical value of m is greater than 1;
mapping, using the one or more processors, the quantity of pixel intensity data to the packed distribution of the sampling to generate a quantity of contrast-enhanced pixel intensity data; and
conforming, using the one or more processors, an intensity of at least one pixel of the image to the quantity of contrast-enhanced pixel intensity data to produce a contrast-enhanced image.

2. The method of claim 1, wherein the statistical distribution is at least one of a Gaussian distribution, a Rayleigh distribution, a normal distribution, a log-normal distribution, a gamma distribution, a binomial distribution, a Cauchy distribution, or a Weibull distribution.

3. The method of claim 1, wherein the statistical distribution is a Rayleigh distribution, and redistributing the sampling is performed according to a sequential relationship $$\{X_n\} = \left\{1 - \left(\frac{m-1}{m}\right)^n\right\},$$

wherein the sequential relationship is defined by a=

$$a = 0, b = 1, X_1 = \frac{b-a}{m}, \text{ and } X_i = \frac{b - X_{i-1}}{m} + X_{i-1} \text{ for all } X_1 - X_n.$$

4. The method of claim 1, wherein the statistical distribution is a Gaussian cumulative distribution, and redistributing the sampling is performed according to a first sequential relationship $$X_i = X_{i-1} + \left(\frac{b - X_{i-1}}{m}\right) \text{ for all } i \in \left\{\frac{n}{2} + 1, n - 1\right\}$$

and a second sequential relationship $$X_j = X_{j+1} + \left(\frac{a - X_{j+1}}{m}\right) \text{ for all } j \in \left\{2, \frac{n}{2} - 1\right\},$$

wherein each of the first sequential relationship and the second sequential relationship is defined by a=0 and b=1.

5. The method of claim 1, wherein the numerical value of m is adjusted, by the one or more processors, in response to an average intensity of the quantity of pixel intensity data, wherein the numerical value of m is increased in response to an increase in the average intensity and the numerical value of m is decreased in response to a decrease in the average intensity.

6. A non-transitory computer-readable medium having computer-executable instructions for performing a method comprising:
  conforming, using one or more processors, a sampling of a quantity of pixel intensity data of an image to a statistical distribution, wherein the sampling comprises n points;
  redistributing the sampling, using the one or more processors, by recursively removing, for each of the n points, 1/m values from a range of distribution values available for point n−1 to generate a packed distribution of the sampling, wherein a numerical value of m is greater than 1;
  mapping the quantity of pixel intensity data to the packed distribution of the sampling to generate a quantity of contrast-enhanced pixel intensity data; and
  conforming an intensity of at least one pixel of the image to the quantity of contrast-enhanced pixel intensity data to produce a contrast-enhanced image.

7. A system for processing an image comprising:
  one or more processors;
  an image capture device;
  an image display device; and
  computer executable instructions that when executed cause the processor to:
    receive, from the image capture device, a quantity of pixel intensity data for an image;
    conform a sampling of the quantity of pixel intensity data to a statistical distribution, wherein the sampling comprises n points;
    redistribute the sampling by recursively removing, for each of the n points, 1/m values from a range of distribution values available for point n−1 to generate a packed distribution of the sampling, wherein a numerical value of m is greater than 1;
    map the quantity of pixel intensity data to the packed distribution of the sampling to generate a quantity of contrast-enhanced pixel intensity data;
    conform, on the image display device, an intensity of at least one pixel of the image to the quantity of contrast-enhanced pixel intensity data to produce a contrast-enhanced image for display on an image display device.

8. The system of claim 7, wherein the statistical distribution is at least one of a Gaussian distribution, a Rayleigh distribution, a normal distribution, a log-normal distribution, a gamma distribution, a binomial distribution, a Cauchy distribution, or a Weibull distribution.

9. The system of claim 7, wherein the statistical distribution is a Rayleigh distribution, and the sampling is redistributed according to a sequential relationship $$\{X_n\} = \left\{1 - \left(\frac{m-1}{m}\right)^n\right\},$$

wherein the sequential relationship is defined by $$a = 0, b = 1, X_1 = \frac{b-a}{m}, \text{ and } X_i = \frac{b - X_{i-1}}{m} + X_{i-1} \text{ for all } X_1 - X_n.$$

10. The system of claim 7, wherein the statistical distribution is a Gaussian cumulative distribution, and the sampling is redistributed according to a first sequential relationship $$X_i = X_{i-1} + \left(\frac{b - X_{i-1}}{m}\right) \text{ for all } i \in \left\{\frac{n}{2} + 1, n - 1\right\}$$

and a second sequential relationship $$X_j = X_{j+1} + \left(\frac{a - X_{j+1}}{m}\right) \text{ for all } j \in \left\{2, \frac{n}{2} - 1\right\},$$

wherein each of the first sequential relationship and the second sequential relationship is defined by a=0 and b=1.

11. The system of claim 7, wherein the image capture device is at least one of a charge-coupled device, an active-pixel sensor, a CMOS sensor, a cryogenic detector, a photodiode light sensor, or a photoresistor.

12. The system of claim 7, wherein the image capture device is capable of capturing at least one of a visible light image, an x-ray image, an infrared image, a radar image, a sonar image, or an ultrasound image.

13. The system of claim 7, wherein the image display device is at least one of a cathode ray tube (CRT), a liquid crystal display (LCD), an light emitting diode (LED) monitor, or a touch screen monitor.

* * * * *